(12) United States Patent
Hassan et al.

(10) Patent No.: US 10,033,709 B1
(45) Date of Patent: Jul. 24, 2018

(54) METHOD AND APPARATUS FOR IMPROVING PRIVACY OF COMMUNICATIONS THROUGH CHANNELS HAVING EXCESS CAPACITY

(71) Applicant: Microsoft Technology Licensing, LLC, Redmond, WA (US)

(72) Inventors: Amer A. Hassan, Kirkland, WA (US); Gareth L. Bridges, Redmond, WA (US); Russell A. Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/818,353

(22) Filed: Nov. 20, 2017

(51) Int. Cl.
*H04L 29/06* (2006.01)
*H04L 12/26* (2006.01)

(52) U.S. Cl.
CPC ...... *H04L 63/0428* (2013.01); *H04L 43/0876* (2013.01); *H04L 63/166* (2013.01); *H04L 69/22* (2013.01)

(58) Field of Classification Search
CPC ............. H04L 63/0428; H04L 43/0876; H04L 63/166; H04L 69/22
See application file for complete search history.

(56) References Cited

U.S. PATENT DOCUMENTS

| 6,483,904 | B1 | 11/2002 | Yucebay |
| 6,504,838 | B1 | 1/2003 | Kwan |
| 7,062,025 | B2 | 6/2006 | Summers et al. |
| 7,082,102 | B1 | 7/2006 | Wright |
| 7,280,530 | B2 | 10/2007 | Chang et al. |
| 8,489,963 | B2 | 7/2013 | Park et al. |
| 9,253,332 | B2 | 2/2016 | Dye et al. |
| 9,294,721 | B2 | 3/2016 | Thakkar et al. |
| 2001/0024452 | A1* | 9/2001 | Liu .......................... H04L 47/10 370/468 |
| 2002/0097726 | A1* | 7/2002 | Garcia-Luna-Aceves ................. H04L 47/215 370/395.31 |

(Continued)

FOREIGN PATENT DOCUMENTS

WO     2001049011 A1     7/2001

OTHER PUBLICATIONS

"Oracle's Session Initiation Protocol Trunking Solution", Retrieved From <<http://www.oracle.com/us/industries/communications/sip-trunking-solution-ssep-br-2075881.pdf>>, Retrieved on: Sep. 8, 2017, pp. 1-8.

(Continued)

*Primary Examiner* — Darren B Schwartz
(74) *Attorney, Agent, or Firm* — Schwegman Lundberg & Woessner, P.A.

(57) ABSTRACT

A method and apparatus for enhancing privacy of a data packet stream between first and second network nodes over a channel having a total bandwidth receives data packets of the data packet stream at the first network node and determines a current bandwidth used by the received data packets. The first node generates multiple spoof packets and interleaves the spoof packets and the received packets to generate an interleaved packet stream having a bandwidth that is greater than the current bandwidth and less than the total bandwidth. The first node transmits the interleaved packet stream to the second network node.

26 Claims, 7 Drawing Sheets

(56) References Cited

U.S. PATENT DOCUMENTS

| | | | |
|---|---|---|---|
| 2002/0152085 A1* | 10/2002 | Tsushima | G10L 19/0208 704/500 |
| 2002/0161884 A1* | 10/2002 | Munger | H04L 45/00 709/224 |
| 2003/0110288 A1* | 6/2003 | Ramanujan | H04L 63/0272 709/238 |
| 2003/0188159 A1* | 10/2003 | Josset | H04L 12/1836 713/163 |
| 2004/0223739 A1* | 11/2004 | Suzuki | G11B 27/005 386/241 |
| 2006/0075135 A1* | 4/2006 | Rambhia | H04L 9/36 709/238 |
| 2006/0146780 A1* | 7/2006 | Paves | H04N 7/17336 370/348 |
| 2007/0070948 A1 | 3/2007 | Kezys et al. | |
| 2007/0124626 A1* | 5/2007 | Lee | H04L 1/0009 714/704 |
| 2013/0347105 A1* | 12/2013 | Neumann | H04L 63/1441 726/22 |
| 2016/0219024 A1 | 7/2016 | Verzun et al. | |
| 2017/0034589 A1* | 2/2017 | Rozenberg | H04N 21/64322 |
| 2017/0104520 A1* | 4/2017 | Rainish | H04B 7/18513 |

OTHER PUBLICATIONS

"Session Border Controllers (SBC) for Microsoft Skype for Business", Retrieved From <<http://www.audiocodes.com/products/microsoft-skype-for-business-sbc>>, Retrieved on: Sep. 8, 2017, 2 Pages.

\* cited by examiner

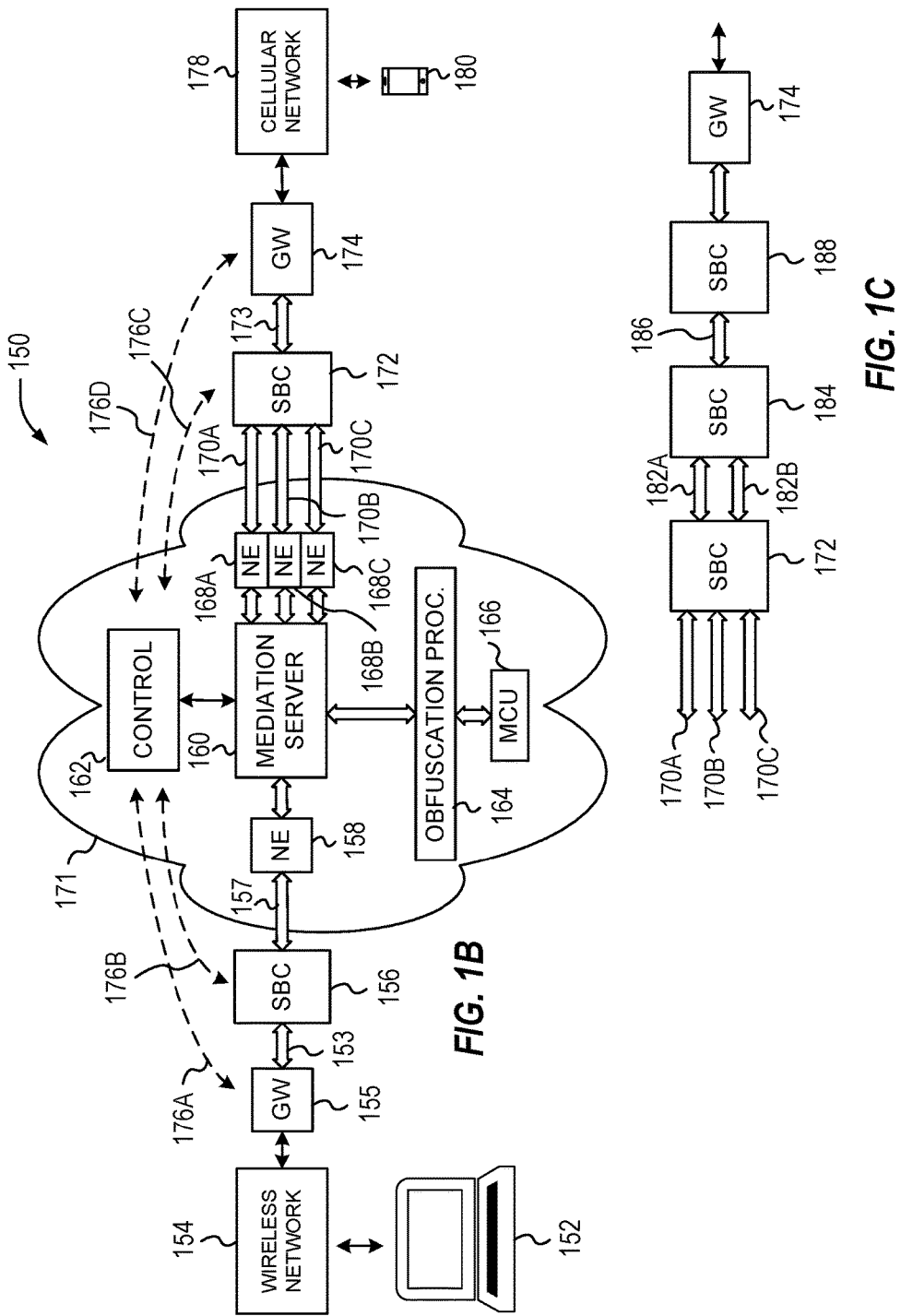

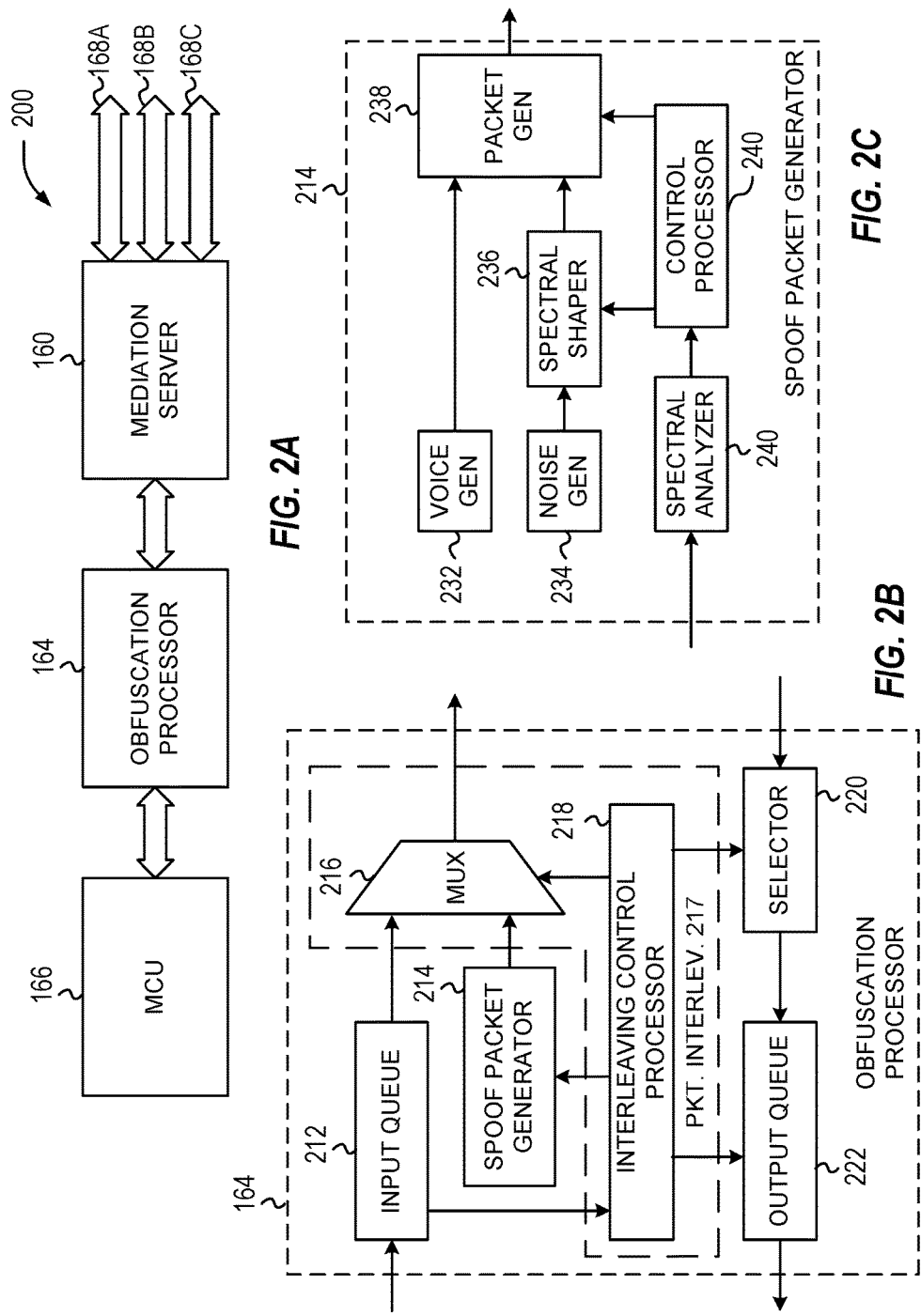

METHOD AND APPARATUS FOR IMPROVING PRIVACY OF COMMUNICATIONS THROUGH CHANNELS HAVING EXCESS CAPACITY

BACKGROUND

Network communication systems and applications, such as Voice over Internet Protocol (VoIP) systems and Skype® systems, have become popular platforms for implementing voice calls among users and for other types of communication such as video calls, teleconferences, telepresence meetings, collaboration via shared applications, and other point-to-point or multi-user network-based communications. These network systems typically rely upon packet communications and packet routing, such as the Internet, rather than the dedicated lines or frequency bands used by traditional circuit-switched communications, such as the Public Switched Telephone Network (PSTN) or circuit-switched cellular networks.

In many examples, communication links can be established among user devices to provide voice and video calls or interactive conferencing using software applications that may be implemented on many different types of devices, such as, without limitation, desktop computers, laptop computers, tablet devices and smartphones. Because these communication channels are not confined to dedicated resources, a malicious user may extract packet data using a network monitoring tool, such as WIRESHARK® to tap into the channels and reconstruct the communications from the extracted packet data.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An example method and apparatus includes enhances privacy of a data packet stream between first and second network nodes over a channel having a total bandwidth receives data packets of the data packet stream at the first network node and determines a current bandwidth used by the received data packets. The first node generates multiple spoof packets and interleaves the spoof packets and the received packets to generate an interleaved packet stream having a bandwidth that is greater than the current bandwidth and less than the total bandwidth. The first node transmits the interleaved packet stream to the second network node.

Another example method and apparatus processes a data stream received from a channel between the receiving node and a transmitting node, the received data stream including a plurality of network data packets interleaved with spoof packets. A control processor receives, an encrypted interleaving pattern indicating which packets in the data stream are the network data packets and which packets are the spoof packets and decrypts the encrypted interleaving pattern. A selector uses the interleaving pattern to select the network data packets from the received data stream and to discard the spoof packets.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description when considered in conjunction with the drawings.

BRIEF DESCRIPTION OF THE DRAWINGS

FIGS. 1A, 1B and 1C are block diagrams of example communication networks.

FIGS. 2A, 2B and 2C are functional block diagrams of example components of a communication network.

DETAILED DESCRIPTION

Figure 1A:
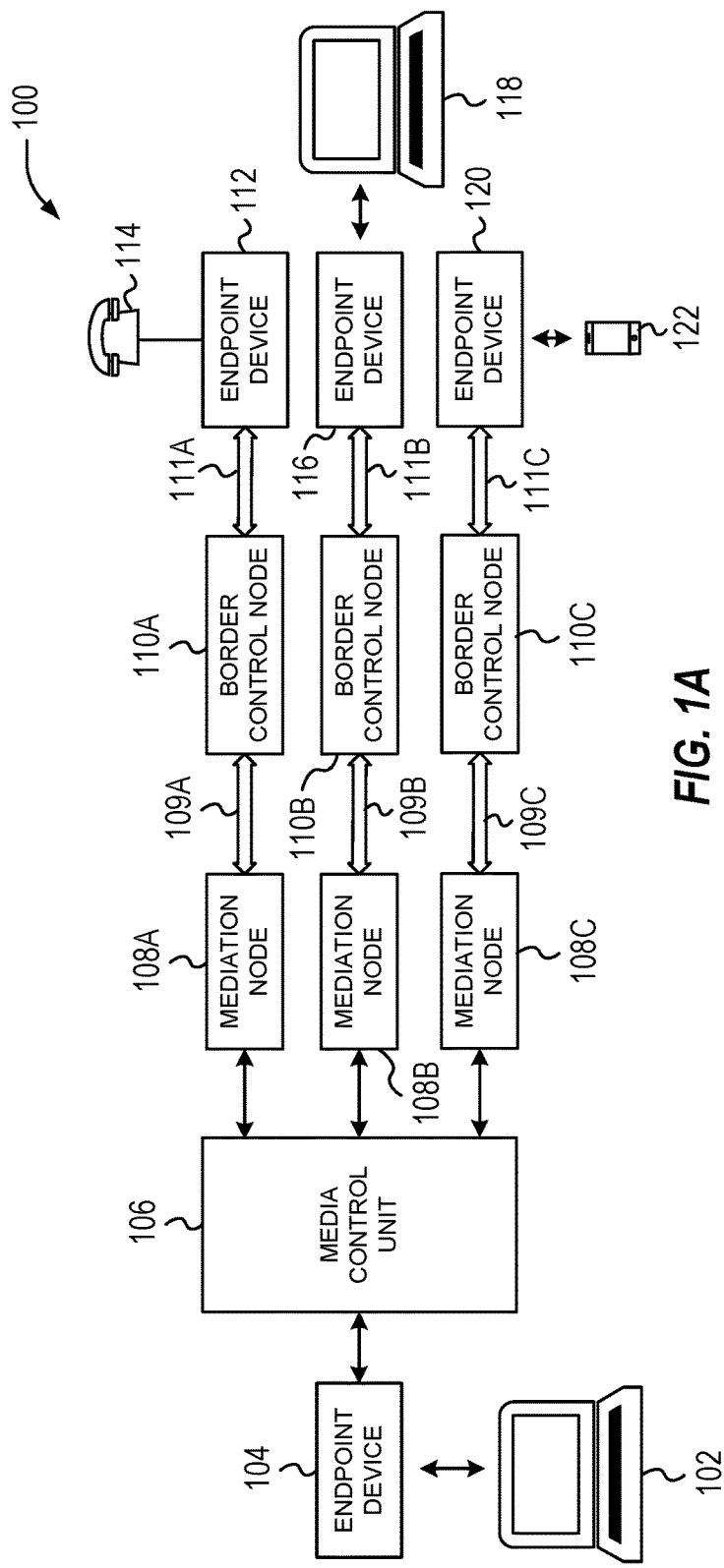

In example embodiments described below, a transmitting node may enhance privacy of a data packet stream conveyed to a receiving node over a channel by interleaving packets of the data packet stream with spoof packets. The spoof packets are interleaved with the data stream packets according to an interleaving pattern that may be sent from transmitting node to the receiving node via an encrypted transmission. The receiving node uses the interleaving pattern to reconstruct the data packet stream by discarding the spoof packets.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Network communication systems, such as Voice over Internet Protocol (VoIP) systems, Skype® systems, Skype® for Business systems, Zoom®, and other online group conferencing systems, allow multiple users at disparate locations to engage in voice calls, video calls, live information sharing, telepresence video conferences, and/or other interactive network-based communications. Such communications and collaborations may use multiple networks to transport packet data among the endpoint nodes of the various users. These network communication systems can span one or more packet networks, such as a local area network (LAN), wireless LAN (WLAN) or a wide area network (e.g. the Internet), to connect any number of endpoint user equipment devices. Furthermore, multiple networks can route individual communication sessions, for example, when the two endpoints are associated with different networks. For communications involving multiple networks, border control elements can communicatively couple these different networks and establish communication links that route traffic among the networks. These border control elements can include session border controllers (SBCs) in VoIP examples, and can also include nodes to convey communications over different types of networks, such as voice gateways when communications are directed to an endpoint on a PSTN network or packet gateways when communications are directed to an endpoint on a wireless or cellular network. Each network may convey a single packetized media stream or multiple packetized media streams including, without limitation, voice (e.g. VoIP) packets, video packets/or and data communication packets, among the members of a group. It is contemplated that a media stream may include more types of packets and may include multiple packet types or a single packet type. In some embodiments, data communication packets may be used to implement data sharing among the conference participants, for example screen sharing or transmitting data files among the participants.

Privacy is a concern in these network communication systems, especially systems that span multiple networks. As described above, a malicious user may extract packet data using a network monitoring tool to tap into the one or more of the components and reconstruct the communications from the extracted packet data. The use of encryption and secure connections such as transport layer security (TLS) can enhance privacy but these techniques may be difficult to deploy across multiple networks and may not be easily adapted to older technologies such as PSTN telephone sets.

To provide enhanced privacy in network communication systems, various examples are provided below. FIG. 1A is a functional block diagram of an example network communication system 100 that implements data security using excess bandwidth in the network channels. System 100 includes endpoint devices 104, 112, 116, and 120, media control unit 106, mediation nodes 108A, 108B, and 108C and respective border control elements 110A, 110B, and 110C. Mediation nodes 108A, 108B, and 108C communicate with their respective border control elements 110A, 110B, and 110C using packet links 109A, 109B, and 109C. The border control elements 110A, 110B, and 110C, in turn, communicate with the respective endpoint devices 112, 118, and 120 via the packet links 111A, 111B, and 111C. In some examples, the packet links 109A, 109B, 109C, 111A, 111B, and 111C may each include a respective session initiation protocol (SIP) trunk. Although not shown in FIG. 1A, it is contemplated that the connection 105 between the endpoint device 104 and the media control unit 106 may also include a packet link, in which case, the system may include an additional mediation node (not shown) between the connection 105 and the media control unit 106.

In the example shown in FIG. 1A, user equipment devices such as personal computers 102 and 118, PSTN telephone set 114, and cellular telephone 122 engage in a shared conference that is coordinated by the media control unit 106. Thus, in this example, the endpoint device 112 may include a voice gateway (not shown) coupled to a PSTN (not shown), the endpoint devices 104 and 114 may include respective packet gateways coupled to respective local area networks (LANs) (not shown) or wireless local area networks (WLANs) (not shown) and the endpoint device 120 may include a packet gateway (not shown) coupled to a cellular network (not shown). Each of the packet links 109A, 109B, 109C, 111A, 111B, and 111C may be configured to support a greater bandwidth than the packet data being conveyed. For example, the packet links 109A, 109B, and 109C between the mediation nodes 108A, 108B, and 108C and the respective border control nodes 110A, 110B, and 119C may each include one or more SIP trunks. The example system uses this excess bandwidth to obfuscate the network communications by adding spoof packets that are ignored by the mediation nodes 108A, 108B, and 108C and border control nodes 110A, 110B, and 119C. In some embodiments, the spoof packets may be configured to mimic the network communication packets.

In the example system shown in FIG. 1A, a processor, for example, the media control unit 106 has pre-stored the maximum bandwidth of each of the packet links 109A, 109B, and 109C and is able to determine the bandwidth of the current packet data being conveyed across each of the links 109A, 109B, and 109C. The differences between these two bandwidths represent excess bandwidth available for use in each of the packet links 109A, 109B, and 109C. In the example system, the processor 106 may generate spoof packets that occupy a portion of this excess bandwidth and interleave the spoof packets with data packets (e.g. voice packets, video packets, and data communication packets of one or more communication and/or collaboration sessions) being sent over the packet links 109A, 109B, and 109C. These spoof packets may have headers matching the headers of the data packets and payloads resembling the payloads of the data packets. The processor may also generate respective interleaving patterns that control how the spoof packets and data packets are interleaved when transmitted through each of the packet links 109A, 109B, and 109C. The respective interleaving patterns may be sent via a secure connection between the mediation nodes 108A, 108B, and 108C and the border control nodes 110A, 110B, and 110C so that the data packets may be accurately recovered from the interleaved data. The obfuscation of the data packets is described in greater detail below.

Although the examples below describe a collaboration data stream being interleaved with spoof packets, it is contemplated that any data packet stream may be similarly processed where the bandwidth of the data packet stream and other packetized data streams sent through a channel is less than the total bandwidth of the channel.

FIG. 1B is a block diagram showing another example network communication system 150. In the system 150, a personal computer 152 coupled to a wireless network 154 communicates with a collaboration cloud 171 through a gateway 155, an SBC 156 and a channel 157. The collaboration cloud may also include a mediation server 160, a control processor 162, an obfuscation processor 164, a media control unit (MCU) 166 and network elements (NEs) 168A, 168B, and 168C. The NEs 168A, 168B, and 168C couple the collaboration cloud 171 to an SBC 172 via three SIP trunks 170A, 170B and 170C. The SBC 172 is a border control element between the collaboration cloud 171 and a gateway 174 of the cellular network 178. The SBC 172 communicates with the gateway 174 via a channel 173. A user of the mobile device 180 coupled to the cellular network 178 participates in the teleconference with a user of the personal computer 152 using the services provided by the collaboration cloud 171.

In some examples, the collaboration cloud 171 may be a web-based service or a service within a network coupled to the wireless network 154. The gateway 155 connects to the collaboration cloud via the SBC 156, channel 157 and network element (NE) 158. The NE 158 as well as the NEs 168A, 168B, and 168C include interface elements in the collaboration cloud 171 to interface processing circuitry in the cloud 171 with external communication channels. As described above with reference to FIG. 1A, the MCU 166 may combine data streams from multiple collaborating participants and provide the combined data streams to each of the participants. Furthermore, the collaboration cloud may host multiple collaboration sessions among different sets of collaboration participants. As described below, the control processor 162 may communicate with the SBCs 156 and 172 and, optionally, with the gateways 155 and 174 to monitor the unused bandwidth of the SIP trunks 170A, 170B, and 170C and, optionally, the unused bandwidth of the channels 153, 157 and 173 and provides the unused bandwidth information to the obfuscation processor 164.

The example system 150 includes three SIP trunks, 170A, 170B, and 170C connecting the mediation server 160, via the respective NEs 168A, 168B, and 168C, to the SBC 172. Each of the SIP trunks 170A, 170B, and 170C has a maximum bandwidth and the channel formed by the SIP trunks has a maximum total bandwidth. The communications conveyed by the trunks 170A, 170B, and 170C occupy a portion of this total bandwidth. As described below, using information about these bandwidths, the obfuscation processor 164 may determine an excess bandwidth of the channel and an amount of bandwidth to be used to send spoof packets. In the example shown in FIG. 1B, collaboration data from personal computer 152 and mobile device 180 may be combined in MCU 166 to generate the combined collaboration data shared between the personal computer 152 and mobile device 180. To ensure privacy, the obfuscation processor 164 may interleave the combined collaboration data packets of one or more collaboration sessions with the spoof packets and send the interleaved packet stream to the mediation server 160. The obfuscation processor 164 may also generate an interleaving pattern and may send the interleaving pattern to the SBC 172. Alternatively, the control processor 162 may generate the interleaving pattern and provide it to the obfuscation processor 164. The obfuscation processor 164 and/or the mediation server 160 may use the interleaving pattern to interleave the spoof packets among the combined collaboration data packets. Furthermore, the mediation server 160 and/or obfuscation processor 164 may divide interleaved stream among the three SIP trunks 170A, 170B, and 170C for transmission to the SBC 172. Both the assignment of data packets and spoof packets in a particular sequence and the assignment of particular packets among the SIP trunks 170A, 170B, and 170C may be specified in the interleaving pattern.

The SBC 172 may also include an obfuscation processor (not shown) which operates in the same way as the processor 164 to interleave data packets provided by the gateway 174 with spoof packets for transmission to the collaboration cloud 171. In this instance, the SBC 172 may use the interleaving pattern generated by the control processor 162 and/or obfuscation processor 164 or may generate a separate interleaving pattern for the data packets and spoof packets sent from the SBC 172 to the collaboration cloud 171.

As described above, the control processor 162 may also monitor unused or excess bandwidth in channel 157 between the SBC 156 and the network element 158 as well as the unused bandwidth in channel 153 between the SBC 156 and the gateway 155 and the unused bandwidth in channel 173 between the SBC 172 and the gateway 174. The processor 164 may take the bandwidths of these channels into account in determining the bandwidth to be occupied by the spoof packets. In some example systems, the obfuscation processor may limit the bandwidth occupied by the spoof packets based on the minimum unused bandwidth of the channels used to convey the collaboration data packets.

FIG. 1C shows a portion of another example system in which the collaboration session crosses three network boundaries using three SBCs, 172, 184, and 188. SBC 172 is coupled to the collaboration cloud 171 via a set of three SIP trunks 170A, 170B, and 170C. SBC 172, however, is coupled to SBC 184 by a set of two SIP trunks 182A and 182B, while SBC 184 is coupled to SBC 188 by a single SIP trunk 186. In this example, the control processor 162 may monitor the unused bandwidth in each set of SIP trunks and limit the bandwidth allocated to the spoof packets to a portion of the unused or excess bandwidth among the channels connecting the SBCs (e.g. a portion of the excess bandwidth of SIP trunk 186).

FIG. 2A shows a portion 200 of the system 150 shown in FIG. 1B. The portion 200 includes the MCU 166, obfuscation processor 164, mediation server 160, and the three SIP trunks 168A, 168B, and 168C. As described above, the MCU 166 receives collaboration data packet streams from all of the participants in one or more collaboration session and combines these data packets into respective combined collaboration data streams. Each collaboration data stream is sent to all of the participants of the collaboration session. The obfuscation processor 164 may also receive individual obfuscated streams from each participant and remove spoof packets from the received packet before providing the packet streams to the MCU 160.

FIG. 2B shows an example obfuscation processor 164. The example processor 164 includes an input queue 212, a spoof packet generator 214, a multiplexer 216, An interleaving control processor 218, a selector 220 and an output queue 222. The multiplexer 216 and the interleaving control processor 218 form a packet interleaver 217. In this example, the selector 220 receives one or more data packet stream from the one or more collaborating participants. Prior to receiving these packet streams, the obfuscation processor 164 receives or generates one or more interleaving patterns describing how the data packets in the various streams are interleaved with the spoof packets. Responsive to the interleaving pattern(s), the selector 220 extracts the data packets from the data stream and provides the data packets to the output queue 222. Data from the output queue 222 may be provided to MCU 166 as shown in FIG. 2A.

As it combines the various component data streams into a collaboration stream, the MCU 166 provides packets of the combined stream to the input queue 212. The multiplexer 216 and the interleaving control processor 218 form a packet interleaver. Packets from the input queue 212 are applied to one input port of the multiplexer 216 while spoof packets from the spoof packet generator 214 are applied to the other input port of the multiplexer 216. The interleaving control processor 218, responsive to the one or more interleaving patterns, interleaves packets from the combined collaboration stream with the spoof packets. The interleaved packet stream(s) provided by the multiplexer 216 may be provided to one or more mediation servers 160.

FIG. 2C is a block diagram of an example spoof packet generator 214. The example spoof packet generator 214 includes a voice signal generator 232, a noise generator 234, a spectral shaper 236, a packet generator 238, a spectral analyzer 240, and a control processor 242. The example obfuscation processor 164 generates spoof packets that appear to be valid voice packets, video packets and/or data communication packets to be inserted in the interleaved packet stream. Alternatively, the spoof packet generator may generate packets having no content (null packets) or packets having random content. The spoof packet generator 214 shown in FIG. 2C illustrates two ways of generating voice packets. The first way uses the voice generator 232 which randomly or pseudo-randomly generates voice data representing words and/or phonemes. In this example system, the voice data is applied to the packet generator 238 to be included as the payload of the spoof packets. The voice signal generator 232 may include a random noise source (not shown) such as a shot noise generator, a 1/f pink noise generator, or a white noise generator. To randomly generate the voice data, the voice signal generator 232 may use data from the noise source to select words and/or phonemes from a dictionary. Alternatively, the noise source may be a pseudorandom noise source, such as a pseudorandom number generator (not shown).

The second example method for generating voice packets uses a noise generator 234 that generates noise signals having a bandwidth that spans the range of human vocal frequencies. These noise signals are applied to a spectral shaper 236 which, responsive to a spectral analyzer 240, filters the noise signals to have frequency characteristics similar to the voice signals one or more of the collaborating participants. The filter characteristics used by the spectral shaper 236 may be determined by the spectral analyzer 240 which is coupled to receive the voice signals of the collaborating participants. The spectral analyzer 240 may, for example, apply a fast Fourier transform to one or more of the VoIP packet payloads to generate a single set of filter characteristics from the voice signals of one or more of the collaborating participants or may generate multiple sets, one for each type of participant (e.g. male and female). Output signals of the spectral shaper 236 may be applied to the packet generator 238 to be included in the payload of the spoof packets. In some embodiments, the spectral analyzer 240 may be eliminated and the spectral shaper 236 may use one or more generic voice spectrums to shape the noise signals provided by the noise generator 234.

The spectral analyzer 240, noise generator 234, and spectral shaper 236, may also or alternatively be used to generate spoof packets that mimic the data communication packet streams. As described above, data communication packet streams may include, for example, shared screens, transferred data files, video streams and/or other non-voice communications. In some examples, the spectral analyzer 240 may analyze one or more data streams shared by the collaborating participants to generate filter characteristics. The spectral shaper 236 uses the filter characteristics to generate spoof data streams having frequency characteristics similar to the collaboration data communication stream. In some embodiments, the spectral analyzer may be eliminated and the control processor 240 may, instead, apply known filter characteristics to the spectral shaper to generate spoof data streams. In some embodiments, the spectral shaper 236 may be eliminated and the random or pseudorandom noise provided by the noise generator 234 may form the spoof data stream.

The packet generator 238 may also copy packet headers from the data packets of the combined collaboration stream and use the copied packet headers as the packet headers of the spoof packets. As described above, the packets from the packet generator 238 are applied to the multiplexer 216 to be interleaved with the data packets of the combined collaboration stream provided via the input queue 212 according to the interleaving pattern. Alternatively the spoof packets may be configured with null header data or random header data.

Figure 3A:
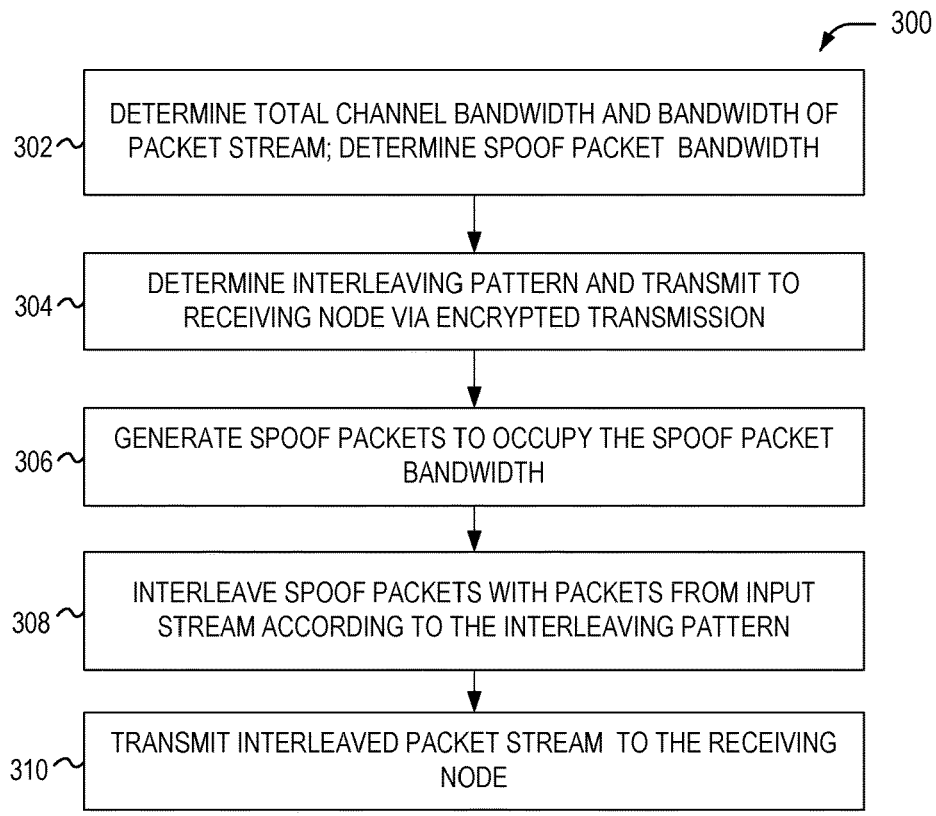
FIGS. 3A and 3B are flow-chart diagrams useful for describing example embodiments.
Figure 3B:
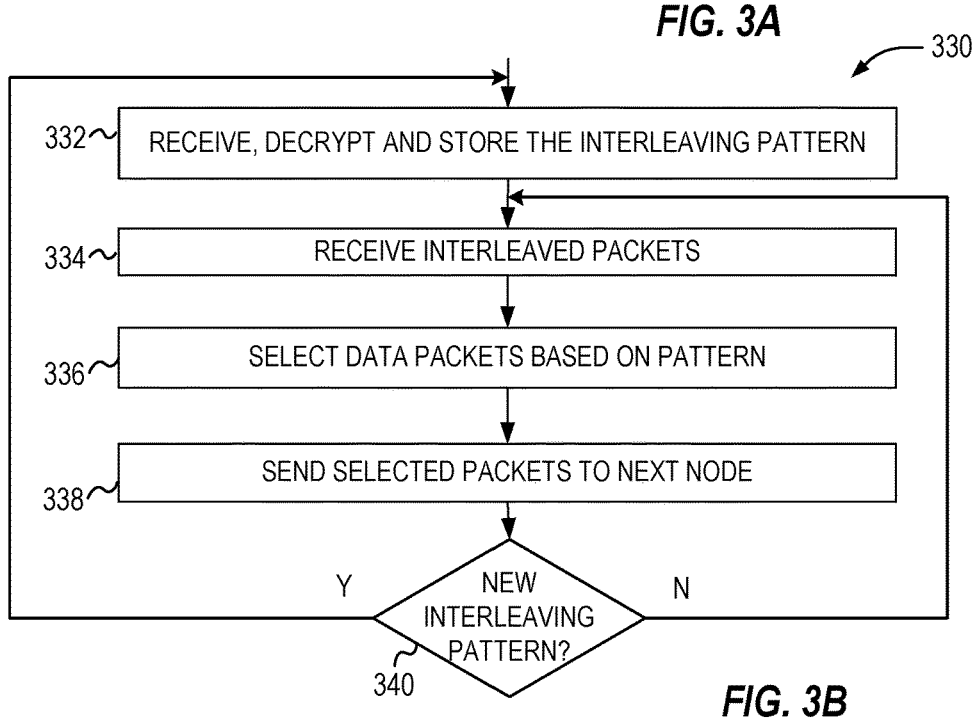
Figure 4A:
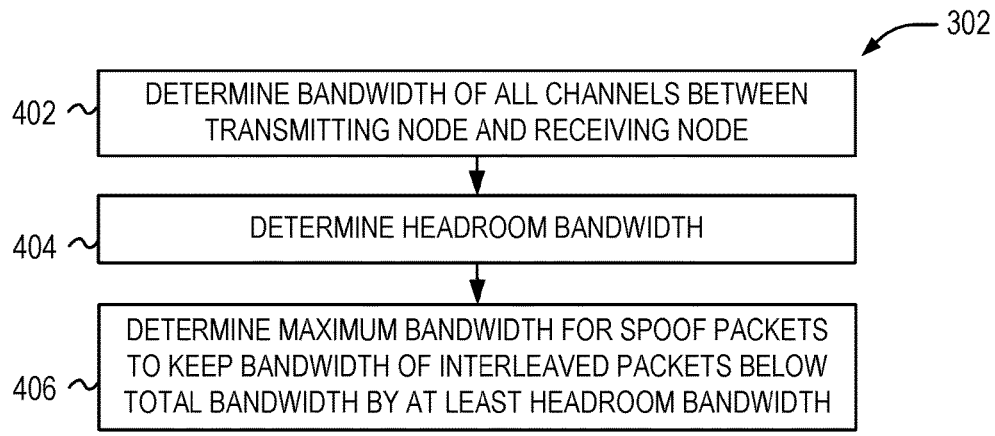
FIGS. 4A, 4B and 4C are flow-chart diagrams of example embodiments of blocks shown in FIG. 3A.
Figure 4B:
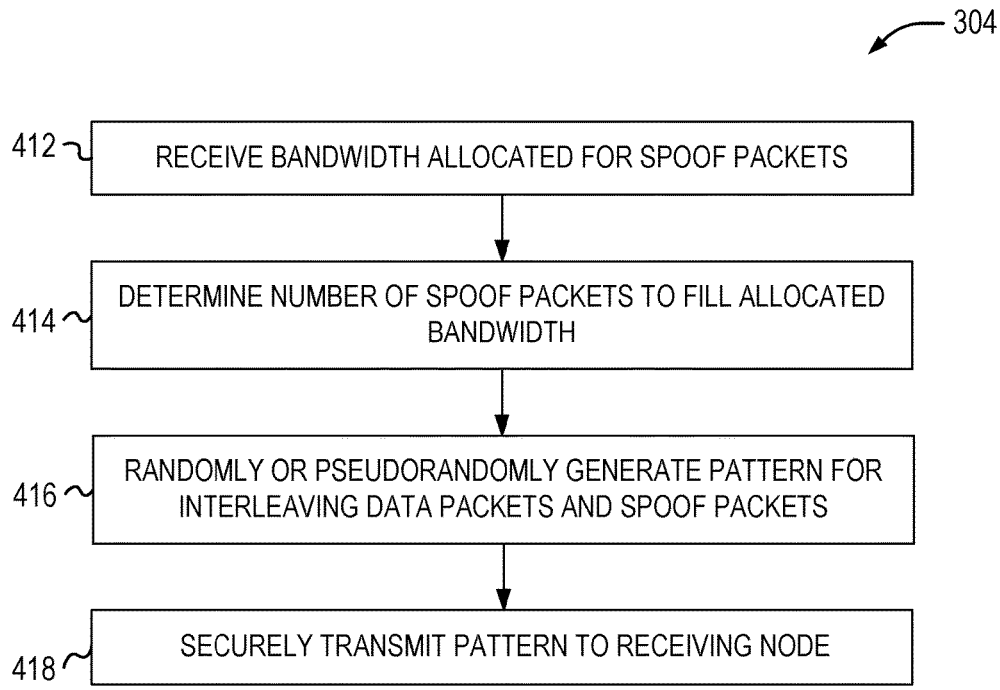

FIGS. 3A, 4A and 4B are flowchart diagrams which illustrate an example process 300 performed by the control processor 162 and the obfuscation processor 164. The process 300 interleaves spoof packets with the collaboration data packets for transmission by a transmitting node (e.g. the mediation server 160 or the SBC 172) over a communication channel to a receiving node (e.g. the SBC 172 or mediation server 160). FIG. 3B is a flow-chart diagram of a second process 330 that may be performed by the control processor 162 and/or the obfuscation processor 164 or by a control processor (not shown) and/or a second obfuscation processor (not shown) in the receiving node. The process shown in FIG. 3B receives the interleaved packet stream from the communication channel and selects the data packets from the interleaved packet stream. Each control processor/obfuscation processor may perform both processes 300 and 330.

With reference to FIG. 1B, the obfuscation processor 164 may perform process 300 on voice packets, video packets and/or data communication packets provided, for example, by the MCU 166 while process 330 may be performed by the on interleaved packets received by the obfuscation processor 164 separately from each of the collaboration participants via one or more mediation servers 160. As described above, the SBCs 156 and 172 and, optionally, the gateways 155 and 174 may also include control processors/obfuscation processors to select data packets from received interleaved packet streams provided by the collaboration cloud 171 and to interleave spoof packets with voice packets, video packets and/or data communication packets received from the endpoints for transmission to the collaboration cloud 171.

At block 302 of the example process 300, the transmitting node (e.g. the control processor 162 and mediation server 160) of the collaboration cloud 171 may determine the total channel bandwidth and the bandwidth of the packet stream to be interleaved with the spoof packets. Block 302 is shown in more detail in FIG. 4A. At block 402, the control processor 162 may monitor the bandwidth of various channels in the system 150 using signals received from the mediation server 160, SBCs 156 and 172, and optionally the gateways 155 and 174. In some embodiments, the signals may be generated based on real-time control protocol (RTCP) loops for media streams transferred between two nodes, for example, between the mediation server 160 and the SBC 172. Where, as shown in FIG. 1B, there are three SIP trunks, 170A, 170B, and 170C, between the mediation server 160 and the SBC 172, the control processor 162 may monitor the bandwidth of all three trunks together or of each trunk individually. The control processor 162 may also monitor RTCP loops between the gateway 155 and the SBC 156 mediation server 160, between the SBC 156 and the gateway 155 and/or between the SBC 172 and the gateway 174 This RTCP signaling is indicated by the arrows 176A, 176B, 176C, and 176D in FIG. 1B.

Block 302 may also determine an amount of bandwidth to be used by the spoof packets. The bandwidth used by the spoof packets is desirably less than the unused or excess bandwidth and channel to allow for fluctuations in the bandwidth of the data streams sent through the channels. For example, data packets may occupy 20 percent of the total channel bandwidth leaving and unused or excess bandwidth of 80 percent. At block 406 of FIG. 4A, the process 300 may limit the bandwidth used by the interleaved packet stream to leave a packet headroom of, for example, 30 percent of the total channel bandwidth. The 30 percent packet headroom bandwidth is only one example, it is contemplated that the packet headroom bandwidth may range between 10 percent and 50 percent. Thus, in this example, the bandwidth allocated to the spoof packets may be between 10 percent and 70 percent of the total channel bandwidth.

The packet headroom is desirably sufficient to accommodate fluctuations in the bandwidth of the data packets over time based on amounts of data being shared among all of the collaboration participants. The bandwidth used by the voice packets, video packets and data communication packets may increase significantly, for example, when a new participant joins one of the collaborations or when the collaboration cloud 171 starts a new collaboration. Significant, longer-term increase in the data packet bandwidth may cause the control processor 162 may reduce the spoof packet bandwidth to reset the packet headroom bandwidth to its original value. Conversely, a participant leaving a collaboration may result in a decrease in data packet bandwidth, allowing for an increase in the spoof packet bandwidth. Such changes in spoof packet bandwidth, however, may also cause the control processor 162 to change the interleaving pattern which, as described below, may result in significant out of band signaling among the network nodes 160, 156, 172 and optionally 155 and 174. To prevent unnecessary signaling, control processor 162 may implement hysteresis in increase or decrease of spoof packet bandwidth such that only a significant (e.g. greater than 10 percent) change in data packet bandwidth over a time period (e.g. greater than five seconds) may result in a change in the spoof packet bandwidth.

Once the data packet bandwidth and spoof packet bandwidth have been determined, block 304 of the process 300, shown in more detail in FIG. 4B, determines the interleaving pattern and transmits the interleaving pattern to the receiving node via an encrypted transmission. At block 412, block 304 receives an indication of the bandwidth allocated for the spoof packets and, at block 414 determines a number of spoof packets to produce in order to fill the allocated spoof bandwidth during a current time interval. The determined number of packets may include a number of packets of each of a plurality of packet types, including, without limitation, VoIP packets, video packets and/or data communication packets to be sent using the interleaving pattern. It is contemplated that other types of spoof packets may be generated. It is also contemplated that the generated packets may be configured to mimic packets in the collaboration stream. Block 416 randomly or pseudorandomly generates the interleaving pattern to be applied to generate the interleaved packet stream.

The interleaving pattern may be generated using an interleaving algorithm that may generate, for example, a large binary value (e.g. between 100 and 100000 bits) in which each packet is mapped to one element (e.g. bit) of the pattern. Each element (bit) having a first value (e.g. logic 1) may represent a data packet and an element having a second value (e.g. logic 0) may represent a spoof packet. In the example, the length of the predetermined interval may be the average packet rate times the number of elements in the interleaving pattern.

Where there are multiple channels between the transmitting node and the receiving node, for example, the three SIP trunks 170A, 170B and 170C, shown in FIGS. 1A and 1B, the pattern may also indicate on which trunk the packet is to be conveyed. In this instance, each element of the interleaving pattern may include multiple bits, for example, two-bits to indicate the SIP trunk and one bit to indicate whether the packet is a data packet or a spoof packet.

In some embodiments, rather than a binary packet type indicator, each element of the interleaving pattern may include multiple bits that map to a packet type, for example "00" may represent a VoIP packet, "01" may represent a video packet, "10" may represent a data communication packet and "11" may represent a collaboration data packet. The ratio of each spoof packet type to all spoof packets in the pattern is desirably the same as the ratio of each data packet type to all data packets in the collaboration data stream. The spoof packet elements of the interleaving pattern are desirably randomly or pseudorandomly distributed among the data packet elements.

In some embodiments, the interleaving pattern may be generated by a mapping algorithm or function, such as a pseudorandom number generator, that uses a seed value to generate sequential pseudorandom single-bit or multi-bit values, where each value may represents a packet type and/or a data channel through which the corresponding packet is to be conveyed. When a pseudorandom number generator is used to implement the mapping algorithm, ranges of values of the pseudorandom numbers may be assigned to the different packet types and sub-ranges within these ranges may be assigned to the different data channels. In these examples, both the transmitting node and the receiving node may use the same mapping algorithm or function and the data used to reproduce the interleaving pattern may be transmitted from the transmitting node to the receiving node by securely transmitting the seed value and data describing the ranges.

Block 418 securely sends the interleaving pattern from the transmitting node (e.g. the mediation server 160) to the receiving node (e.g. the SBC 172) via an encrypted transmission. The pattern or seed value and ranges may be sent unencrypted if a secure in-band channel (e.g. a TLS channel) exists between the transmitting node and the receiving node. Alternatively, the transmitting node may broadcast, via out-of-band signaling, a public key to the receiving node and receive the public key of the receiving node whereby the interleaving pattern or seed value and ranges may be encrypted using the public key of the receiving node before being sent from the transmitting node to the receiving node, via in-band or out-of-band signaling. While a public key/private key encryption is described, it is contemplated that other encryption techniques may be used, including symmetric encryption techniques such as data encryption standard (DES) and triple DES as well as asymmetric encryption techniques such as Diffie-Hellman and elliptic curve cryptography.

The interleaving pattern may be changed frequently (e.g. each interleaving pattern may be used only once) to increase security in environments where messages are likely to be intercepted. Where interception is less likely, the interleaving pattern may be changed less frequently to reduce the in-band and/or out-of-band signaling used to convey the pattern or seed value. For example, as described below the interleaving pattern may changed when there is a significant change in the bandwidth of the data signals conveyed by the channel.

Figure 4C:
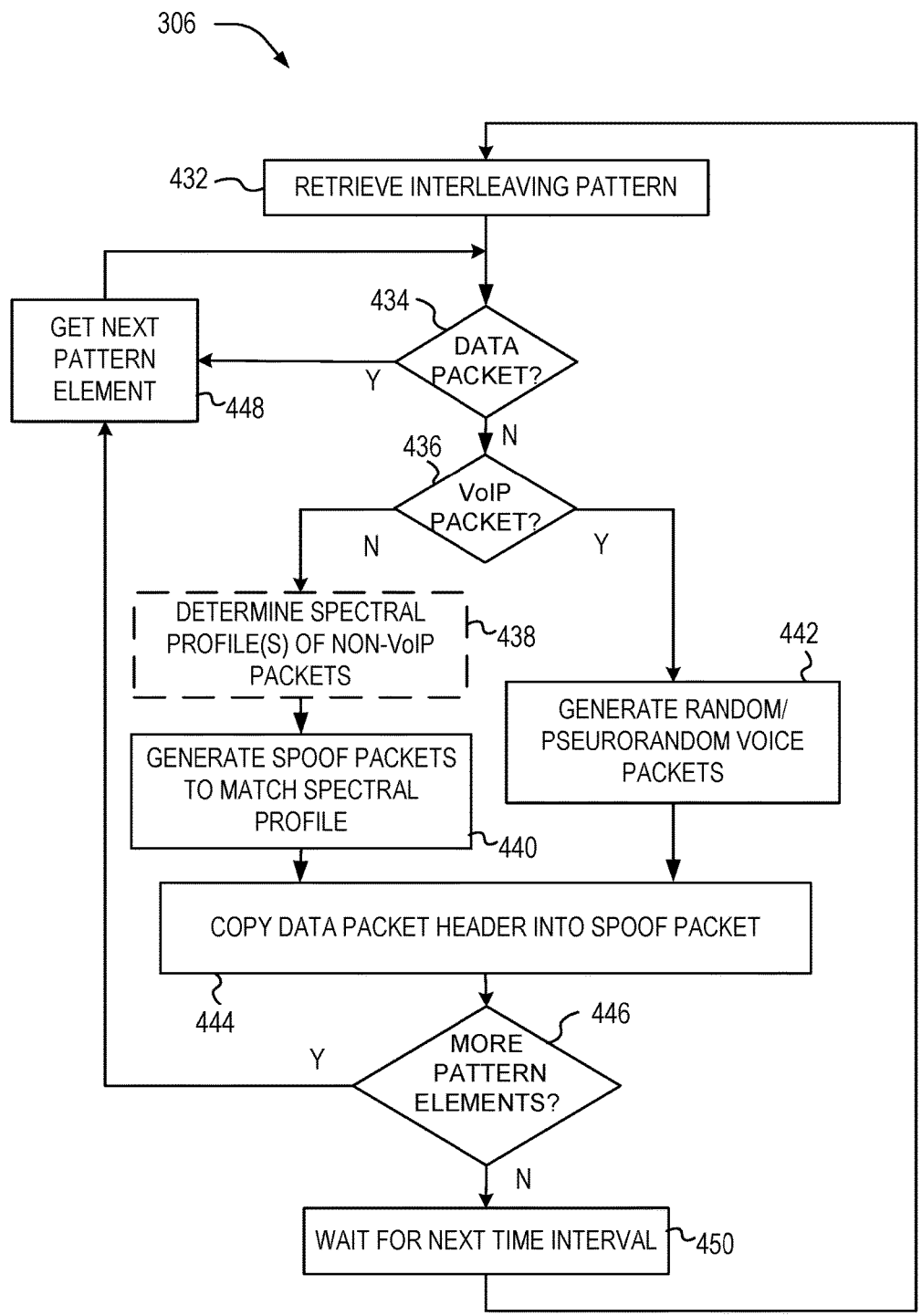

Block 306 of the example process 300 is shown in more detail in FIG. 4C. Block 306 generates the spoof packets to occupy the spoof packet bandwidth for a current time interval as determined by block 414 of FIG. 4B. Packets may be generated using the packet generator 214 described above with reference to FIG. 2C. Alternatively, the spoof packets may be generated using a software algorithm, as shown in FIG. 4C that generates voice packets, video packets, and/or data communication packets which may have randomly assigned content and headers and/or content and headers that mimic the content and headers of the collaboration data packets. In the example shown in FIG. 4C, block 432 retrieves the interleaving pattern which indicates the packet type (e.g. VoIP, video, data communication or collaboration data) to be inserted in each packet position during the predetermined interval. Block 434 determines whether the next indicated packet type is a collaboration data packet. If the next packet type is a collaboration data packet, the process branches to block 448 to get the next pattern element otherwise, the process branches to block 436 to determine whether the spoof packet type indicated by the pattern element is a VoIP packet. If the spoof packet type is not VoIP, block 438 optionally determines one or more spectral profiles of the non-VoIP packet types (e.g. video or data communication) in the collaboration stream. Block 440 then generates spoof packet data to match the spectral profile, as described above with reference to FIG. 2C, these spoof packets may be generated by applying a filter matching the spectral profile of the packets to randomly generated data values.

Block 438 is indicated as being optional. Instead of determining the spectral profiles of the non-VoIP packets, the process may use one or more preset spectral patterns. It is contemplated that there may be one or more such spectral patterns for each packet type.

When, at block 436, the interleaving pattern indicates a VoIP packet type, block 442 generates random or pseudorandom voice data for a VoIP spoof packet. This may be implemented as described above with reference to FIG. 2C or may be implemented by randomly accessing a dictionary of words or phonemes to fill the spoof packet payload. Alternatively, blocks 436 and 442 may be eliminated and all packets may be modeled by their frequency spectrums using block 440 and, optionally, block 438.

Following block 440 or block 442, block 444 copies packet header data from a selected data packet into the header of the spoof packet and stores the spoof packet so that it may be accessed by block 308 of FIG. 3A to generate the interleaved packet stream. Block 446 then determines where there are more pattern elements in the current time interval. If there are more pattern elements, the process transfers control to block 448 to obtain the next pattern element. Otherwise, the process transfers control to block 450 to wait for the next time interval and branch to block 432 to retrieve the interleaving pattern and generate the next set of spoof packets.

At block 308 of FIG. 3A, the example process 300 interleaves the generated spoof packets with the collaboration data packets according to the interleaving pattern determined in block 304. At block 310, the process 300 transmits the interleaved packet stream from the transmitting node to the receiving node.

FIG. 3B shows an example process 330 that may be implemented in a receiving node. This process may be implemented, for example, using hardware and/or software elements such as the interleaving control processor 218 selector 220, and output queue 222 shown in FIG. 2B. Alternatively, the process 330 may be implemented entirely in software. At block 332, the process 330 receives, decrypts, and stores the interleaving pattern. Block 334 receives the interleaved packet stream and block 336 selects the data packets from the interleaved stream based on the interleaving pattern. As described above, the example interleaving pattern may include a mapping algorithm or a long sequence of single-bit or multi-bit elements where each element represents a data packet or a spoof packet. Each element may also represent a spoof packet type and a channel through which the packet (spoof packet or data packet) is to be conveyed. The transmitting node may synchronize the collaboration packet stream to the interleaving pattern, for example, by signaling a first packet of the interleaved packet stream. The transmitting node may then store packets from the interleaved packet stream corresponding to elements indicating collaboration data packets, for example, into the output queue 222 while discarding packets corresponding to the spoof packets. At block 338, the process 330 sends the selected packets as a packet stream to the next node. Block 338 may cooperate with the next node to obfuscate the packet stream with spoof packets.

At block 340, the process 330 determines whether a new interleaving pattern has been received. As described above, the new interleaving pattern may be received as encrypted data via in-band or out-of-band signaling. If no new interleaving pattern has been received, control transfers from block 340 block 334 to continue processing interleaved packets using the current interleaving pattern. When, however, a new interleaving pattern is received at block 340, control transfers to block 332 to receive, decrypt and store the new interleaving pattern and select the collaboration data packets from the interleaved packet stream using the new interleaving pattern.

Figure 5:
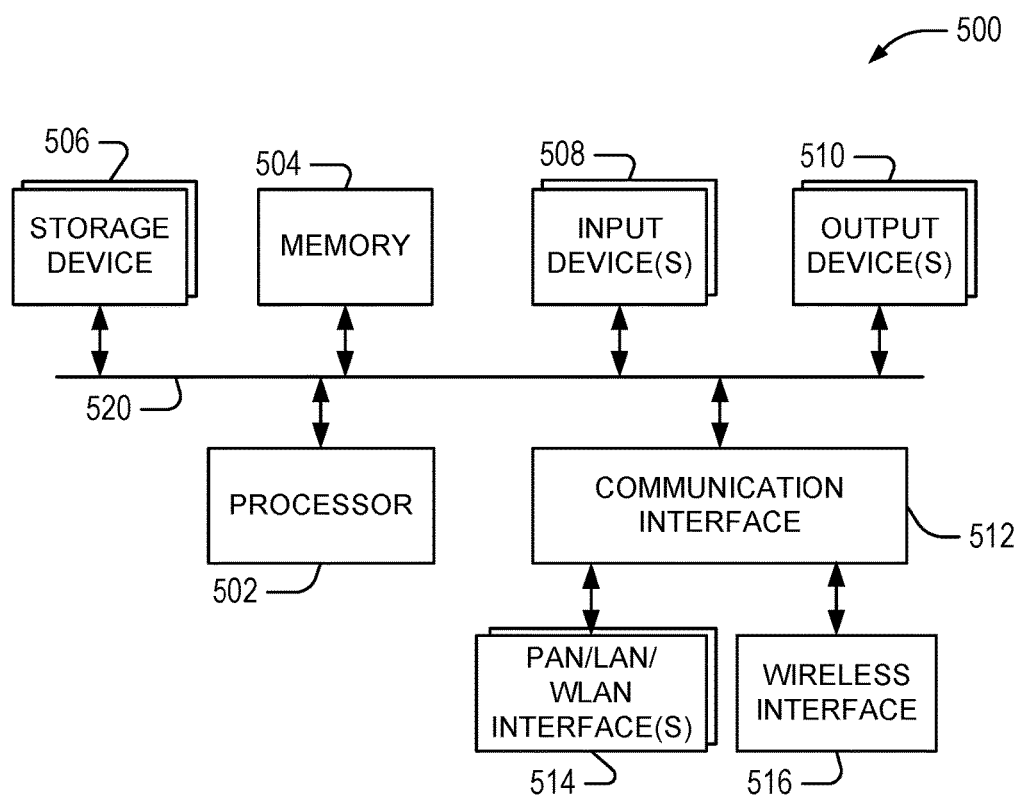
FIG. 5 is a block diagram of example hardware that may be used in an embodiment.

FIG. 5 is a block diagram of an example processing system 500 that may be used as any of the mediation server 160, control processor 162, obfuscation processor 164, and/or MCU 166. The system 500 includes a processor 502 coupled to a bus 520. Also coupled to the bus 520 are a storage device 506 (e.g. a flash memory device or other non-volatile memory device); a memory 504, which may include random access memory (RAM) and read only memory (ROM); one or more input devices 508 (e.g. a keyboard, a touchscreen, a microphone etc.); one or more output devices 510 (e.g. a display screen, a speaker etc.) and a communication interface 512 to provide communication between the system 500 and other systems as described above with reference to FIGS. 1A through 3C. As shown in FIG. 5 the communications interface may be coupled to a PAN/LAN/wireless LAN (WLAN) interface such as a wired or optical Ethernet connection and/or a wireless connection (e.g. IEEE 802.11, IEEE 802.15, etc.). In addition the communication interface 512 may be coupled to a wireless interface such as a 3GPP mobile device interface. The interfaces 514 and 516 may be coupled to respective transceivers and/or modems (not shown) to implement the data communication operations.

Processor 502 may include a single-core or multi-core microprocessor, microcontroller, digital signal processor (DSP) that is configured to execute commands stored in the memory 504 corresponding to the programs (Internet browsers, APIs, DLLs, APPs, etc.) described above. The memory 504 may also store temporary variables or other information used in the execution of these programs. The programs stored in the memory 504 may be retrieved by the processor from a non-transitory machine-readable memory, for example, the storage device 506, or from other non-transitory media such as a CD-ROM, digital versatile disk (DVD), etc.

EXAMPLE 1

In one example, a method implemented in a computing device for enhancing privacy of a data packet stream between first and second network nodes over a channel having a total bandwidth includes receiving, via the first network node, data packets of the data packet stream; determining a current bandwidth used by the received data packets; generating a plurality of spoof packets; interleaving at least some of the spoof packets and the received packets to generate an interleaved packet stream having a bandwidth that is greater than the current bandwidth and less than the total bandwidth; and transmitting the interleaved packet stream to the second network node.

In another example, the channel includes multiple channels and the transmitting of the augmented packet stream includes transmitting the interleaved packet stream to the second network node using the multiple channels.

In yet another example, the first network node includes a mediation server, the second network node includes a session border controller (SBC) and the multiple channels include multiple session initiation protocol (SIP) trunks coupled between the mediation server and the SBC.

In another example, generating the plurality of spoof packets includes generating at least one packet that mimics at least one of the received packets.

In yet another example, generating the plurality of spoof packets includes: generating noise data having a frequency spectrum corresponding to a frequency spectrum of at least one packet of the packet data stream; and formatting the generated noise data in packets to generate the spoof packets.

In another example, generating the plurality of spoof packets further includes: generating the frequency spectrum by analyzing frequency components of the at least one packet of the packet data stream.

In another example, the method further includes: extracting header data from the received data packets; and formatting the spoof packets with the extracted header data.

In another example, the data packet stream includes voice packets and the generating the plurality of spoof packets includes: controlling a voice signal generator to randomly or pseudo-randomly generate voice signals; and formatting the generated voice signals in packets to generate the spoof packets.

In yet another example, the method further includes using a mapping algorithm to interleave the spoof packets with the received packets, the mapping algorithm being known to the first and second network nodes.

In another example, the mapping algorithm includes an interleaving pattern and the method further comprises: encrypting the data defining the interleaving pattern; and sending the encrypted data defining the mapping algorithm from the first node to the second node.

In another example, the data defining the interleaving pattern is sent through the communication channel using transport layer security (TLS) protocol.

In yet another example, the data defining the interleaving pattern is encrypted using an encryption key and is sent using an out-of-band communication channel.

In another example, the first network node includes a mediation server, the second node includes an Nth session border controller (SBC), and the communication channel includes N segments, ordinally numbered first through Nth and N−1 further SBCs, ordinally numbered first through N−1th, where N is an integer greater than 1, a first communication channel segment coupling the mediation server to the first further SBC and N−2 communication channel segments serially coupling the first further SBC to the N−1 further SBCs, and an Nth communication channel coupling the N−1th further SBC to the Nth SBC; and the method further comprises determining the total bandwidth as a smallest bandwidth of the N communication channel segments.

EXAMPLE 2

In one example, an apparatus for enhancing privacy of a data packet stream transmitted between first and second network nodes over a channel having a total bandwidth, the apparatus includes: a control processor, coupled to the first network node, the control processor configured to determine a current bandwidth used by the data packet stream and the total bandwidth of the channel; a spoof packet generator, coupled to the first network node, the spoof packet generator configured to generate a plurality of spoof packets; and an interleaver, coupled to the spoof packet generator and configured to receive the data packet stream, the interleaver configured to interleave at least some of the spoof packets and the packets of the data packet stream to generate an interleaved packet stream having a bandwidth that is greater than the current bandwidth and less than the total bandwidth.

In another example, the interleaver includes an interleaving control processor configured to interleave the spoof packets with the packets of the data packet stream responsive to an interleaving pattern.

In yet another example, the first network node includes a mediation server, the second network node includes a session border controller (SBC) and the channel includes multiple session initiation protocol (SIP) trunks coupled in parallel between the mediation server and the SBC and the interleaving pattern includes a plurality of elements, each element indicating a spoof packet or a data packet and one of the plurality of SIP trunks through which the indicated packet is to be sent.

In another example, the spoof packet generator is configured to generate at least one of the spoof packets that mimics at least one packet in the data stream.

In yet another example, spoof packet generator comprises: a noise source configured to generate noise data having a frequency spectrum corresponding to a frequency spectrum of at least one packet of the packet data stream; and a packet generator configured to format the generated noise data in packets to generate the spoof packets.

In another example, the spoof packet generator further comprises a spectral analyzer configured to determine the frequency spectrum of the at least one packet by analyzing frequency components of the at least one packet of the packet data stream.

In yet another example, the packet generator is configured to: extract header data from the received data packets; and format the spoof packets with the extracted header data.

In another example, the data packet stream includes voice packets and the apparatus further comprises: a voice signal generator configured to randomly or pseudo-randomly generate voice signals; and a packet generator configured to format the generated voice signals in packets to generate the spoof packets.

In another example, the interleaver is further configured to use a mapping algorithm to interleave the spoof packets with the received packets, the mapping algorithm being known to both the first and second network nodes.

In another example, the control processor is configured to: generate an interleaving pattern for use by the mapping algorithm; encrypt data defining the interleaving pattern; and send the encrypted data defining the mapping algorithm from the first node to the second node.

In yet another example, the control processor is configured to encrypt the interleaving pattern is encrypted using an encryption key and to send the encrypted interleaving pattern to the second node using an out-of-band communication channel.

EXAMPLE 3

In one example, an apparatus for use in a receiving node to process a data stream received from a channel between the receiving node and a transmitting node, the received data stream including a plurality of network data packets interleaved with spoof packets, the apparatus includes: a control processor configured to receive, an encrypted interleaving pattern indicating which packets in the data stream are the network data packets and which packets are the spoof packets and configured to decrypt the encrypted interleaving pattern; and a selector, responsive to the interleaving pattern to select the network data packets from the received data stream and to discard the spoof packets.

In another example, the receiving node includes a session border controller (SBC) and the sending node includes a mediation server, the channel includes multiple session initiation protocol (SIP) trunks coupled in parallel between the mediation server and the SBC and the interleaving pattern includes a plurality of elements, each element indicating a spoof packet or a data packet and one of the plurality of SIP trunks through which the indicated packet was received.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method implemented in a computing device for enhancing privacy of a data packet stream between first and second network nodes over a channel having a total bandwidth comprising:
   receiving, via the first network node, data packets of the data packet stream;
   determining a current bandwidth used by the received data packets;
   generating a plurality of spoof packets;
   interleaving at least some of the spoof packets and the received packets to generate an interleaved packet stream having a bandwidth that is greater than the current bandwidth and less than the total bandwidth; and
   transmitting the interleaved packet stream to the second network node.

2. The method of claim 1, wherein the channel includes multiple channels and the transmitting of the interleaved packet stream includes transmitting the interleaved packet stream to the second network node using the multiple channels.

3. The method of claim 2, wherein the first network node includes a mediation server, the second network node includes a session border controller (SBC) and the multiple channels include multiple session initiation protocol (SIP) trunks coupled between the mediation server and the SBC.

4. The method of claim 1, wherein generating the plurality of spoof packets includes generating at least one packet that mimics at least one of the received packets.

5. The method of claim 4, wherein generating the plurality of spoof packets includes:
   generating noise data having a frequency spectrum corresponding to a frequency spectrum of at least one packet of the packet data stream; and
   formatting the generated noise data in packets to generate the spoof packets.

6. The method of claim 5, wherein generating the plurality of spoof packets further includes:
   generating the frequency spectrum by analyzing frequency components of the at least one packet of the packet data stream.

7. The method of claim 5, further comprising:
   extracting header data from the received data packets; and
   formatting the spoof packets with the extracted header data.

8. The method of claim 1, wherein the data packet stream includes voice packets and the generating the plurality of spoof packets includes:
   controlling a voice signal generator to randomly or pseudo-randomly generate voice signals; and
   formatting the generated voice signals in packets to generate the spoof packets.

9. The method of claim 1, further comprising using a mapping algorithm to interleave the spoof packets with the received packets, the mapping algorithm being known to the first and second network nodes.

10. The method of claim 9, wherein the mapping algorithm includes an interleaving pattern and the method further comprises:
    encrypting the data defining the interleaving pattern; and
    sending the encrypted data defining the interleaving pattern from the first node to the second node.

11. The method of claim 9, wherein encrypting the data defining the interleaving pattern includes sending the data defining the interleaving pattern through the communication channel using transport layer security (TLS) protocol.

12. The method of claim 9, wherein encrypting the data defining the interleaving pattern includes encrypting the data defining the interleaving pattern using an encryption key and sending the encryption key from the first node to the second node using an out-of-band communication channel.

13. The method of claim 1, wherein:
    the first network node includes a mediation server, the second node includes an Nth session border controller (SBC), and the communication channel includes N segments, ordinally numbered first through Nth and N−1 further SBCs, ordinally numbered first through N−1th, where N is an integer greater than 1, a first communication channel segment coupling the mediation server to the first further SBC and N−2 communication channel segments serially coupling the first further SBC to the N−1 further SBCs, and an Nth communication channel coupling the N−1th further SBC to the Nth SBC; and the method further comprises determining the total bandwidth as a smallest bandwidth of the N communication channel segments.

14. An apparatus for enhancing privacy of a data packet stream transmitted between first and second network nodes over a channel having a total bandwidth, the apparatus comprising:
    a control processor, coupled to the first network node, the control processor configured to determine a current bandwidth used by the data packet stream and the total bandwidth of the channel;
    a spoof packet generator, coupled to the first network node, the spoof packet generator configured to generate a plurality of spoof packets; and
    an interleaver, coupled to the spoof packet generator and configured to receive the data packet stream, the interleaver configured to interleave at least some of the spoof packets and the packets of the data packet stream to generate an interleaved packet stream having a bandwidth that is greater than the current bandwidth and less than the total bandwidth.

15. The apparatus of claim 14, wherein the interleaver includes an interleaving control processor configured to interleave the spoof packets with the packets of the data packet stream responsive to an interleaving pattern.

16. The apparatus of claim 15, wherein the first network node includes a mediation server, the second network node includes a session border controller (SBC) and the channel includes multiple session initiation protocol (SIP) trunks coupled in parallel between the mediation server and the SBC and the interleaving pattern includes a plurality of elements, each element indicating a spoof packet or a data packet and one of the plurality of SIP trunks through which the indicated packet is to be sent.

17. The apparatus of claim 14 wherein the spoof packet generator is configured to generate at least one of the spoof packets that mimics at least one packet in the data stream.

18. The apparatus of claim 17, wherein spoof packet generator comprises:
   a noise source configured to generate noise data having a frequency spectrum corresponding to a frequency spectrum of at least one packet of the packet data stream; and
   a packet generator configured to format the generated noise data in packets to generate the spoof packets.

19. The apparatus of claim 18, wherein the spoof packet generator further comprises:
   a spectral analyzer configured to determine the frequency spectrum of the at least one packet by analyzing frequency components of the at least one packet of the packet data stream.

20. The apparatus of claim 18, wherein the packet generator is configured to:
   extract header data from the received data packets; and
   format the spoof packets with the extracted header data.

21. The apparatus of claim 14, wherein the data packet stream includes voice packets and the apparatus further comprises:
   a voice signal generator configured to randomly or pseudo-randomly generate voice signals; and
   a packet generator configured to format the generated voice signals in packets to generate the spoof packets.

22. The apparatus of claim 14, wherein the interleaver is further configured to use a mapping algorithm to interleave the spoof packets with the received packets, the mapping algorithm being known to both the first and second network nodes.

23. The apparatus of claim 22, wherein the control processor is configured to:
   generate an interleaving pattern for use by the mapping algorithm;
   encrypt data defining the interleaving pattern; and
   send the encrypted data defining the interleaving pattern from the first node to the second node.

24. The apparatus of claim 23, wherein the control processor is configured to encrypt the interleaving pattern is encrypted using an encryption key and to send the encrypted interleaving pattern to the second node using an out-of-band communication channel.

25. The method of claim 1, further comprising:
   receiving, via the first network node, a further interleaved packet stream from the second network node;
   receiving, via the first network node, an encrypted interleaving pattern indicating which packets in the further interleaved packet stream are data packets and which packets are the spoof packets;
   decrypting the encrypted interleaving pattern; and
   responsive to the interleaving pattern, selecting the data packets from the further interleaved packet stream and discarding the spoof packets.

26. The method of claim 25, wherein receiving the further interleaved packet from the second network node includes receiving the further interleaved packet from a session border controller (SBC) via a mediation server through a channel including multiple session initiation protocol (SIP) trunks coupled in parallel between the SBC and the mediation server and the interleaving pattern includes a plurality of elements, each element indicating a spoof packet or a data packet and one of the plurality of SIP trunks through which the indicated packet was received.

* * * * *